(12) United States Patent  (10) Patent No.: US 6,516,237 B1
Aoki et al.  (45) Date of Patent: Feb. 4, 2003

(54) SYSTEM FOR AND METHOD OF PREPARING MANUFACTURING PROCESS SPECIFICATIONS AND PRODUCTION CONTROL SYSTEM

(75) Inventors: Nobutoshi Aoki, Tokyo (JP); Takahisa Kanemura, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/086,935

(22) Filed: May 29, 1998

(30) Foreign Application Priority Data

May 30, 1997 (JP) .............................................. 9-156084

(51) Int. Cl.[7] .............................................. G06F 19/00
(52) U.S. Cl. ........................................ 700/95; 700/109
(58) Field of Search ........................... 700/95, 97, 108, 700/109; 702/85; 707/1

(56) References Cited

U.S. PATENT DOCUMENTS

| | | | | |
|---|---|---|---|---|
| 4,965,742 A | * | 10/1990 | Skeirik | 700/86 |
| 5,006,992 A | * | 4/1991 | Skeirik | 706/58 |
| 5,461,559 A | * | 10/1995 | Heyob | 700/29 |
| 5,495,417 A | * | 2/1996 | Fuduka | 700/121 |
| 5,659,478 A | * | 8/1997 | Pennisi et al. | 700/95 |
| 5,694,325 A | * | 12/1997 | Fukuda | 700/121 |
| 5,719,796 A | * | 2/1998 | Chen | 703/13 |
| 5,777,876 A | * | 7/1998 | Beauchesne | 700/95 |
| 5,796,986 A | * | 8/1998 | Fuller | 716/1 |
| 5,917,726 A | * | 6/1999 | Pryor | 700/95 |
| 5,933,350 A | * | 8/1999 | Fijimoto | 700/121 |
| 5,995,912 A | * | 11/1999 | DeWolf | 702/85 |
| 5,997,167 A | * | 12/1999 | Crater et al. | 700/79 |
| 6,036,346 A | * | 3/2000 | Hino | 700/121 |
| 6,041,270 A | * | 3/2000 | Steffan | 700/121 |

* cited by examiner

*Primary Examiner*—Thomas Black
*Assistant Examiner*—Ronald D Hartman, Jr.
(74) *Attorney, Agent, or Firm*—Foley & Lardner

(57) ABSTRACT

A system for preparing manufacturing-process specifications employs process data serving both for a production control system and a simulation system, and effectively uses a result of simulation. The system prepares the manufacturing-process specifications through the steps of controlling apparatuses according to the manufacturing-process specifications, to carry out manufacturing processes; collecting data measured through the manufacturing processes; simulating the manufacturing processes according to corresponding models and parameters; correcting the models and parameters according to the collected data; and amending the manufacturing-process specifications according to a result of the simulation.

22 Claims, 10 Drawing Sheets

SYSTEM FOR AND METHOD OF PREPARING MANUFACTURING PROCESS SPECIFICATIONS AND PRODUCTION CONTROL SYSTEM

BACKGROUND OF THE INVENTION

1. Field of the Invention

The present invention relates to a system for preparing and managing manufacturing-process specifications, and particularly, to a system for preparing manufacturing-process specifications, capable of efficiently designing the conditions of individual manufacturing processes.

2. Description of the Prior Art

Manufacturing processes are manually designed by skilled engineers, and simulation is used only to supplement the engineers. Manufacturing-process specifications designed for, for example, a semiconductor large-scale integrated circuit device (LSI) must be edited and checked to see whether or not they are correct according to accumulated knowledge. Then, simulation is carried out according to the specifications, to test the structure of a semiconductor wafer, impurity distributions, and the characteristics of the LSI.

To assist these tasks, several systems have been developed and used in practice in, for example, an LSI manufacturing line. The LSI manufacturing line has a production control system that needs process specifications to specify and control apparatuses that work in the manufacturing line. The process specifications are huge to precisely control the manufacturing line and improve the quality and yield of products. To reduce manpower, time, and careless input mistakes in preparing the process specifications, an assisting system is used.

Also used to assist the preparation of the process specifications are process simulators, device simulators, and circuit simulators. These simulators simulate the manufacturing, electric characteristics, and circuit characteristics of LSIs, and such simulation work is essential before actually manufacturing LSIs to find the problems thereof.

Conventional production control systems control apparatuses for carrying out manufacturing processes according to specifications, independently of simulation. The simulation, however, must use actual manufacturing conditions, to determine or evaluate the manufacturing processes and the electric characteristics of products manufactured through the processes under various conditions. Instead of using every piece of data set for actual manufacturing processes, the conventional simulation uses only part thereof. For example, the prior art simulates a diffusion process only with specifications for charging and discharging a wafer into and from a diffusion furnace, as well as diffusion temperature, diffusion atmosphere, and diffusion time.

Simulation needs specific data such as discretization data for numerical calculations. Such simulation data qualitatively differs from process specification data. Due to this, a prior art of FIG. 1 employs a tool for converting process specification data into simulation data, and simulation data into process specification data. This prior art employs different databases for preparing the process specification data and simulation data. Namely, a database A stores data for a production control system and is used to prepare the process specification data, and a database B stores data for a simulation system and is used to prepare the simulation data. This kind of prior art is disclosed in, for example, Japanese Unexamined Patent Publication Nos. 9-34533 and 6-260380.

LSIs are integrating, adding more values, and improving yield and productivity. This tendency is heightening requirements for reduction in process variations and margins. It is important, therefore, to improve simulation accuracy so that a simulation result conforms to actual manufacturing processes. To faithfully simulate actual manufacturing processes, some prior art tries to adjust existing models of manufacturing processes to reflect actual conditions.

The prior art prepares models and parameters for every process. For example, the prior art prepares a model of impurity diffusion and parameters for a diffusion process according to diffusion temperature, time, and atmosphere.

In practice, each process involves variations due to apparatuses to carry out the process. For example, the operating conditions of a diffusion furnace are influenced by manufacturing variations specific to a heat source of the furnace and by changes in the flow rates and velocities of gases in the furnace. The prior art is incapable of considering these variations because the prior art fixes models and parameters for each process.

Specification data for each process contains data about apparatuses to carry out the process and data for controlling the apparatuses. When preparing simulation data from the specification data, the prior art does not usually pick up the data about apparatuses and data for controlling them.

In this way, the prior art handles the process specification data and the simulation data independently of each other, and therefore, must prepare different databases to store them. Process specifications are usually prepared for each process or for a process sequence, and an engineer is assigned to prepare specifications for a process sequence. An engineer of a given sequence prepares process specifications for the sequence, tests the specifications, and improves them through simulation. Sometimes, the engineer who tests the specifications of a given process sequence differs from the engineer who simulates the process sequence. To complete specifications for the process sequence, many pieces of specification data and simulation data are prepared and tested. These pieces of data are kept by the engineers in charge. When the other engineers want to have technical information such as process specification data, simulation data, prototype evaluation results, and simulation results, they must refer to the engineers in charge.

This hinders the quick transfer and sharing of information, to thereby deteriorate the efficiency of developing LSIs.

To share information, it is necessary to make a collective database of technical know-how and prototype evaluation results obtained from groups of manufacturing processes. Since the process specification data and simulation data of the prior art are separately prepared by engineers, the process specification data, data obtained from manufacturing processes that are based on the process specification data, simulation input data, and simulation resultant data have different formats. As a result, it is difficult to make a collective database of them.

Like the process specification data, the simulation data is based on production and simulation know-how. Accordingly, it is beneficial to make a database of the simulation data. Since the process specification data and simulation data are independent of each other, it is difficult for the prior art to combine them together and utilize them for new simulation.

SUMMARY OF THE INVENTION

An object of the present invention is to provide a system for preparing and controlling manufacturing-process specifications, capable of equally handling production control and simulation and effectively utilizing simulation results. The present invention also provides a method of preparing process data for the system, and a method of manufacturing semiconductor devices with the use of the system.

In order to accomplish the objects, the present invention provides a system for preparing manufacturing-process specifications. The system has a database for storing process data that includes manufacturing-process specifications applied to apparatuses to carry out manufacturing processes and parameters used to simulate the manufacturing processes; a production control system for controlling the apparatuses according to the process data, and collecting data measured through the manufacturing processes; a simulation system for simulating the manufacturing processes according to the process data; and an editing unit for correcting the parameters according to the collected data and amending the manufacturing-process specifications according to a result of the simulation.

The database may collect data for each of the apparatuses and be amended so as to reflect dependence among the apparatuses in carrying out the manufacturing processes.

The database may collect data for each apparatus of the same model and be amended so as to reflect dependence among the apparatuses of the same model in carrying out the manufacturing processes.

The database may consist of a process preparation database for storing the collected data and/or data to be corrected according to a result of simulation, a simulation database exclusive to the simulation system, and a production control database exclusive to the production control system.

The apparatuses may manufacture electronic parts.

The electronic parts may be semiconductor devices.

The process data may include common data serving as process specification data and simulation data. The common data may include process names classified in at least two categories and process conditions classified in at least two categories.

The system may further have an editing unit for editing process flow data that describes at least the sequence of manufacturing processes and the conditions of each of the manufacturing processes; and an editing unit for completing the process data by adding apparatus conditions and simulation conditions to the process data.

The production control system may have an editing unit for adding the names and conditions of apparatuses to the process data.

The simulation system may have an editing unit for adding a result of simulation to the process data.

The manufacturing-process-specification preparing system may further have a retrieval unit for retrieving necessary data from the process data with process conditions as retrieval criteria. The process data includes common data serving as process specification data and simulation data. The common data includes process names classified in at least two categories and process conditions classified in at least two categories.

The system may further have a storage unit for storing models and parameters for apparatuses that are simultaneously operated to carry out a manufacturing process so that the simulation system may use the models and parameters.

The present invention also provides a method of preparing manufacturing-process specifications. The method includes the steps of controlling apparatuses according to the manufacturing-process specifications, to carry out manufacturing processes; collecting data measured through the manufacturing processes; simulating the manufacturing processes according to corresponding models and parameters; correcting the models and parameters according to the collected data; and amending the manufacturing-process specifications according to a result of the simulation.

The method may employ a common database for the manufacturing processes and simulation.

The method may be applicable to manufacturing electronic parts.

The electronic parts may be semiconductor devices.

The common database employed by the method may contain common data serving as process specification data and simulation data. The common data may include process names classified in at least two categories and process conditions classified in at least two categories.

The common database employed by the method may contain at least process flow data, apparatus conditions, and simulation conditions. The process flow data describes the sequence of manufacturing processes and the individual conditions of the manufacturing processes.

The common database may contain the names and conditions of apparatuses.

The common database may contain simulation results.

The common database may contain process names classified in at least two categories and process conditions classified in at least two categories so that the process conditions may be used as retrieval criteria.

The present invention also provides a production control system having a database for storing data according to which the production control system controls apparatuses to carry out processes to manufacture electronic parts. The production control system collects data from the apparatuses through the processes and stores the collected data in the database so that the data in the database may reflect dependence among the apparatuses.

The database may collect data from each of apparatuses of the same model so that the data in the database may reflect dependence among the apparatuses in carrying out the processes.

In this way, the process data is used for the production control system as well as for the simulation system, and simulation results are efficiently used for developing products. The present invention easily makes an integrated database of manufacturing know-how and simulation know-how. The present invention simulates individual apparatuses with the use of models and parameters that have been prepared by considering the processing variations of the apparatuses.

BRIEF DESCRIPTION OF THE DRAWINGS

The aforementioned and other features and objects of the present invention and the manner of attaining them will become more apparent and the invention itself will be best understood by reference to the following description of preferred embodiments taken in conjunction with the accompanying drawings wherein.

DETAILED DESCRIPTION OF THE EMBODIMENTS

The embodiments of the present invention will be described with reference to the accompanying drawings.

FIGS. 2 to 5 show a first embodiment of the present invention.

Figure 1:
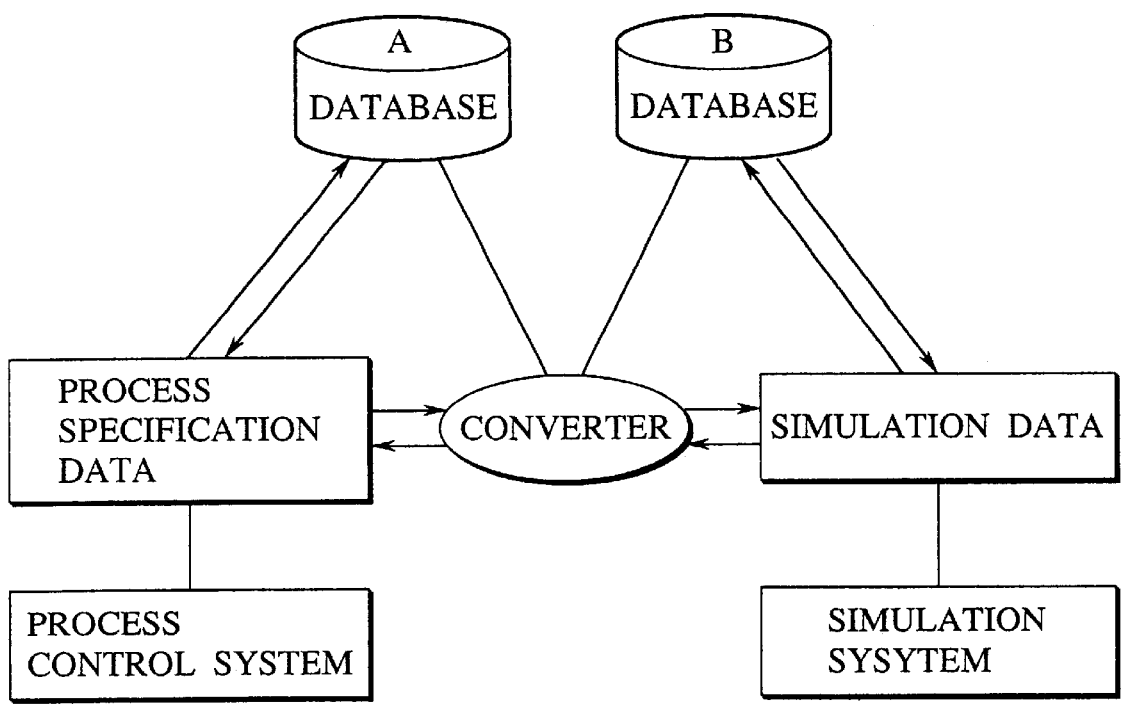
FIG. 1 shows a data preparation tool according to a prior art.
Figure 2:
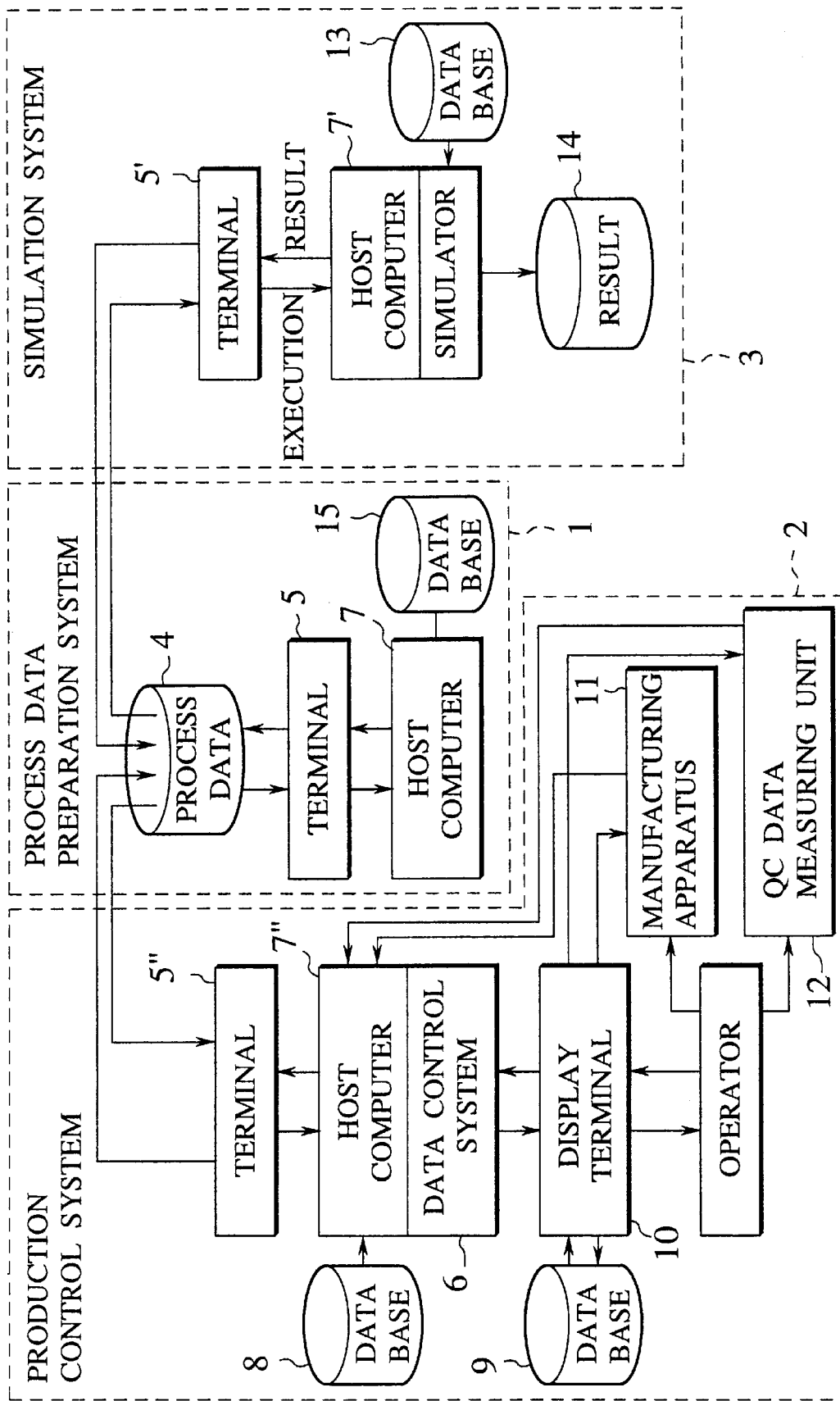
FIG. 2 shows a system for preparing manufacturing-process specifications according to an embodiment of the present invention.

FIG. 2 shows a system for preparing LSI-manufacturing-process specifications according to the embodiment. A process data preparation system 1 prepares process data, which is used by a production control system 2 and a simulation system 3. The process data is prepared from actual manufacturing process data such as a sequence of processes, process conditions, and the names of apparatuses to carry out the processes, and from simulation data such as discretization data and the models and parameters of the processes. According to the process data 4, the production control system 2 issues instructions for the operators of apparatuses in a manufacturing line. The simulation system 3 carries out simulation according to the process data 4.

The present invention integrates the production control system 2 and simulation system 3 through the process data 4 and operates them based on the same process data. The simulation system 3 is important to prepare manufacturing-process specifications for producing LSIs such as ASICs of many kinds in small quantities. The production control system 2 is important to prepare manufacturing-process specifications for producing LSIs such as DRAMs that are not frequently changed in their specifications, in large quantities. Depending on the characteristics of LSIs to manufacture, the systems 2 and 3 change their importance. The present invention uses resultant data provided by one of the systems 2 and 3 to improve the performance of the other, so that the systems 2 and 3 may complement each other.

The details of the simulation system 3 will be explained. A simulation terminal 5' is a computer terminal, which may be an engineering workstation (EWS) or a personal computer (PC) having a display and a keyboard. The terminal 5' is used to carry out simulation and correct and change the process data 4. The terminal 5' is connected to a host computer 7' that loads a simulator to carry out simulation. The host computer 7' may be a single computer, or a network of computers so that the terminal 5' may freely access a proper one of the computers. The network of computers is advantageous to improve work efficiency. Various kinds of simulators may be employed. To develop LSIs, the simulators include process simulators for simulating diffusion and ion implantation processes, device simulators for simulating the electric characteristics of semiconductor elements, and circuit simulators for simulating the operation of circuits. A simulation database 13 stores libraries and parameters used by the simulators. Data pieces stored in the database 13 are general ones required to carry out simulation and are not directly related to actual processes for manufacturing semiconductor devices. The process simulators may include a topography simulator for simulating changes in the shape of an object through processes and a molecular dynamics simulator for simulating atomic and molecular changes in the structure of an object through processes. The simulators are selected by, for example, LSI engineers. Instead, the simulation system 3 may automatically select proper simulators without troubling the engineers.

The details of the production control system 2 will be explained. The process data 4 for the production control system 2 includes process names and process conditions to manufacture semiconductor devices. A data control system 6 centrally controls entered data and has an editing function for adding collected data to the process data 4 and deleting some data from the process data 4. The data control system 6 uses a database 8. The production control system 2 has a host computer 7". A production control database 9 stores QC (quality control) data measured through actual processes. A terminal 10 is for operators in the manufacturing line and displays instructions related to operating conditions. The terminal 10 is also used to enter QC data measured in the manufacturing line. The production control system 2 not only issues instructions to the operators through the terminal 10 but also directly controls individual apparatuses 11 in the manufacturing line. Namely, the production control system 2 may directly collect the conditions of the processes and directly control a QC data measuring unit 12 to collect data from the apparatuses 11. The collected QC data is stored in the database 8 through the host computer 7". Apparatus data such as the names of apparatuses in the manufacturing line are transferred from the apparatuses 11 to the data control system 6, which changes the process data 4 accordingly. The QC data measured by the measuring unit 12 is transferred to the data control system 6, which adds the data to the process data 4.

The present invention uses the same process data 4 for the simulation system 3 and production control system 2, to equally handle simulation, LSI manufacturing, and LSI prototype preparation.

The details of the process data 4 and process data preparation system 1 will be explained. A terminal 5 is used by engineers to enter process data. The process data includes the kinds of tasks to manufacture LSIs, processing conditions, simulation models, model parameters, and simulators. If the engineers are process engineers or device engineers who are not familiar with simulation, the system 1 will provide standard discretization data for simulation from a database 15. The system 1 may have a tool for selecting proper discretization grid intervals and calculation domains.

To develop an LSI or make an LSI prototype, engineers must prepare a process flow. In this case, the engineers may retrieve, from the database 15, proper data that partly or wholly contains the process flow to prepare, display it on a display, and use it to complete the process flow. In this way, the system 1 lets the engineers effectively use accumulated data and know-how about processes, apparatuses, and simulation. For engineers who are not familiar with simulation, the system 1 provides process data including simulation information so that the engineers may easily carry out simulation and efficiently use simulation results to develop LSIs.

Figure 4:
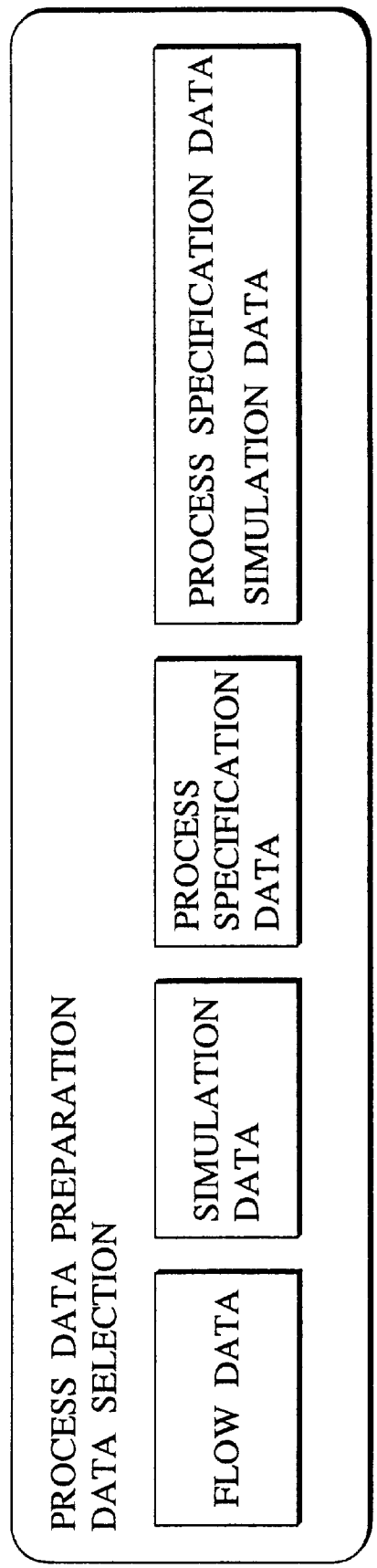
FIG. 4 shows the preparation of the process data.

Preparing and editing the process data 4 will be explained. The process data 4 includes process specification data and simulation data. The process data 4 must easily be prepared even by process engineers who are not familiar with simulation, or by simulation engineers who are not familiar with apparatus control. Accordingly, as shown in FIG. 4, the present invention lets the engineers prepare four types of data, i.e., flow data, process specification data, simulation data, and process data that is an integration of the process specification data and simulation data. Any one of the data types is selectable by clicking a mouse in a window of a display. The flow data is prepared by specifying a series of processes such as a diffusion process, an ion implantation process, and a deposition process. The flow data is used as criteria to retrieve proper process data from the database 15. The retrieved data is edited and used.

It is necessary to quickly identify whether the retrieved data partly or wholly agrees with the flow data to prepare. For this purpose, the system 1 has an identification function. The flow data is also used to verify a series of processes extracted from the process data 4. The flow data consists of process names and process conditions shown in FIG. 3. The terminal 5 is used to specify processes that are not essential for the retrieval operation. For example, a contamination removal process to be carried out before a diffusion process will not be essential for the retrieval operation. Specifying such inessential processes makes the retrieval operation easier.

Figure 3:
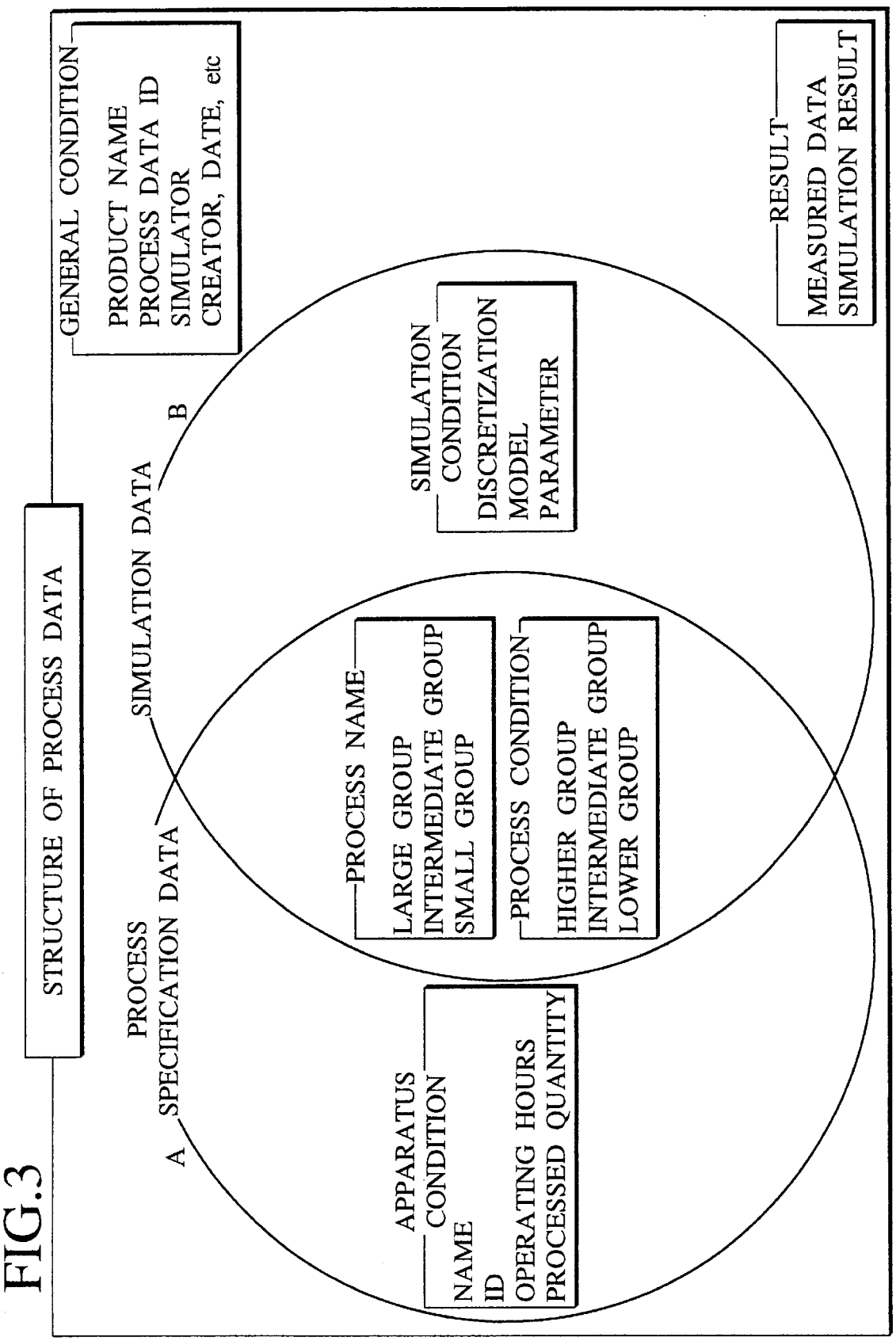
FIG. 3 shows the structure of process data according to the present invention.

The process specification data and a way of preparing process data from the process specification data will be explained. In FIG. 3, process specification data A consists of process names, process conditions, and apparatus conditions. An assisting tool is used to prepare the process specification data. Then, discretization data, model equations, and parameters needed for simulation are added to the process specification data, to complete the process data. The database 15 may have standard simulation data for the process names and process conditions, respectively, so that proper simulation data is retrieved from the database 15 and added to the process specification data.

The simulation data will be explained. A way of preparing process data from the simulation data resembles that from the process specification data A. In FIG. 3, simulation data B consists of process names, process conditions, and simulation conditions. An assisting tool is used to prepare the simulation data B. Then, the process names and process conditions are used as criteria to retrieve corresponding apparatus conditions from the database 15 (FIG. 2). The retrieved data is added to the simulation data B, to complete the process data 4.

An assisting tool is provided to enable a skilled engineer to prepare the process data 4 from process specification data and simulation data from the beginning. The assisting tool lists process names to let the engineer select a proper one of them and then lists process conditions for the selected process to let the engineer select a proper one of them. In this way, the assisting tool successively displays lists of process names, process conditions, apparatus conditions, and simulation conditions, to let the engineer efficiently prepare the process data 4.

A similar assisting tool may be provided for preparing the simulation data.

In FIG. 2, the process data preparation system 1, production control system 2, and simulation system 3 have the terminals 5, 5", and 5', respectively. The terminal 5 may be connected to the simulation host computer 7' so that the terminal 5 may carry out simulation. The terminal 5 may be connected to the data control system 6 so that the terminal 5 may handle the production control system 2. The terminal 5' may be connected to the host computers 7 and/or 7" so that the terminal 5' may use the host computer 7 and access the production control system 2. Although the embodiment arranges the host computers 7, 7', and 7" independently of each other, a large computer may be employed in place of three or two of them.

The embodiment directly provides the simulation system 3 and production control system 2 with the process data 4. It is possible to prepare simulation data from the process data 4 and provides it to the simulation system 3. It is also possible to prepare process specification data from the process data 4 and provides it to the production control system 2. In this case, QC data collected in the production control system 2 and simulation results provided by the simulation system 3 are stored in the original process data 4. This will be explained with reference to FIG. 5. A process data preparation system 40 of FIG. 5 has an editor-retriever 42 and a display 47. The editor-retriever 42 prepares, from process data 41, flow data 43, process specification data 44, and simulation data 45. The system 40 also has a database 46. The database 46 is not essential for the system 40, and if there is another database, it may be connected to the system 40 and used in place of the database 46. The process specification data 44 is supplied to a production control system 48 to manufacture LSIs and prototypes. QC data collected in the production control system 48 is stored in the process data 41 through the editor-retriever 42.

The simulation data 45 is supplied to a simulation system 49, and simulation results are stored in the process data 41. If necessary, the process data 41 is stored in the database 46 after the completion of LSI manufacturing and simulation. In this way, the flow data, process specification data, and simulation data are made from the process data 41, and data collected from manufacturing processes and simulation results are returned to the process data 41.

A second embodiment of the present invention will be explained with reference to FIGS. 2, 3, and 10.

This embodiment relates to a structure of process data and a technique of retrieving process data from the database 15. The structure of process data is shown in FIG. 3. The embodiment will be explained in connection with LSI and prototype manufacturing processes.

The process data includes general conditions such as a product name, a process data identification (ID) number, a simulator name, a simulator version, a creator's name, and the object of the process data. The process data also includes process names, process conditions, apparatus conditions, simulation conditions, and resultant data. Among the LSI manufacturing processes, a diffusion furnace process includes a diffusion process as a large group, an oxidization process as an intermediate group, and a gate oxidization process as a small group. The process conditions are divided into a higher group including temperature, time, oxidization thickness, and atmosphere, an intermediate group including temperature and time to charge an object into a diffusion furnace and heating and cooling speeds, and a lower group including timing (for example 10 minutes later) to start the diffusion process after removing contaminants and natural oxide films.

The apparatus conditions include apparatus names, apparatus IDs, and operation conditions such as that the apparatuses must be started within one week after maintenance. The simulation conditions include discretization conditions, simulation models, and parameters. The resultant data includes, in the case of the diffusion process, actual oxide film thicknesses and simulation results.

A technique of retrieving necessary data from the process data will be explained. A product name and a process name such as a diffusion process are used as retrieval criteria. Generally, the LSI and prototype manufacturing processes involve little data that agrees with the data stored in the database 15. For example, an oxidization process may provide different oxide film thicknesses even if it is carried out under the same temperature and atmosphere. Accordingly, this embodiment retrieves data according to the name of a product, or according to process names classified in the large, intermediate, and small groups.

Retrieving data according to the name of a product will be explained. When improving the performance of an existing product or when correcting processes of an old product, it is necessary to refer to the process specifications of the specific product and correct them. In this case, the name or ID of the specific product is used as a retrieval criterion. The retrieved data includes know-how collected through the development, manufacturing, and simulation of the product. In this way, the present invention effectively uses accumulated knowledge to improve and develop products.

In developing an LSI product, it is frequent to need the conditions of part of manufacturing processes and make a prototype from the part. In this case, the name or ID of a corresponding product is used as a criterion to retrieve related data from the database, and the retrieved data is used to prepare process specifications. Retrieving, from the database, actually measured data proximate to the prototype to make avoids double fabrication of the prototype and reduce developing cost and time.

Figure 8:
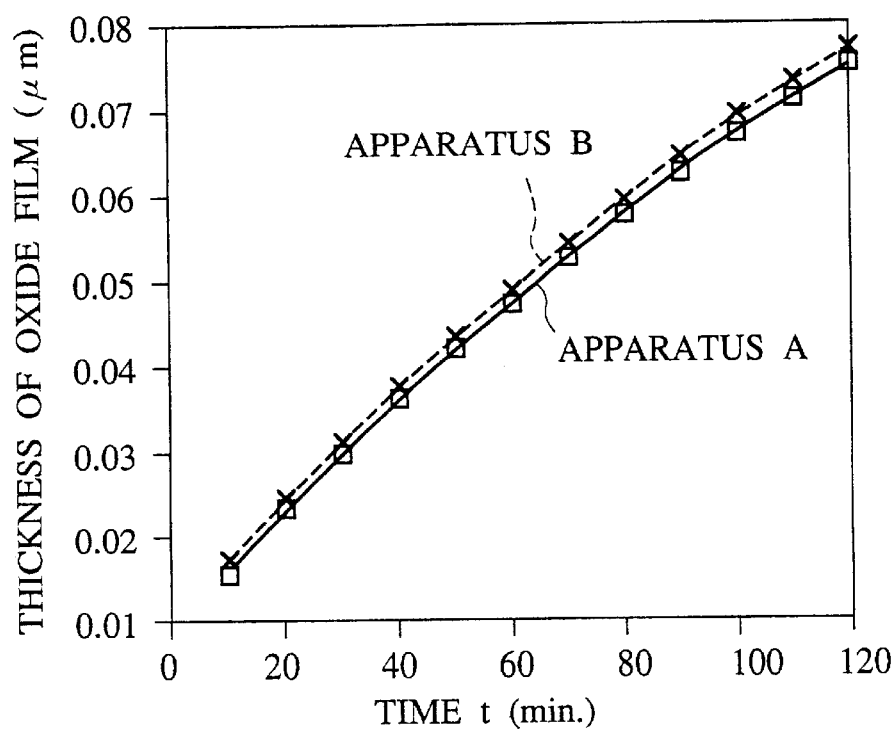
FIG. 8 shows relationships between oxide film thickness and oxidization time in a simulated oxidization process of silicon wafers, according to the present invention.

A retriever for retrieving such proximate data from the process data stored in the database will be explained. As explained above, the process data contains process names classified in the large, intermediate, and small groups, and therefore, a series of processes to make the prototype are first retrieved from the process data. At this time, any process that plays a minor role in the series of processes may be changed in its position. For example, a process of measuring the thickness of an oxide film does not need a strict position in the series of processes. It can be executed any time as long as the oxide film is exposed. Then, the position of the measuring process is varied in the series of processes when retrieving data from the process data. The retrieval operation is first carried out on the large group, and then, on the intermediate and small groups. It is possible to carry out the retrieval operation only on the large and intermediate groups. To retrieve process conditions from the process data, the retrieval operation is carried out on the higher, intermediate, and lower groups of conditions. In this way, the present invention retrieves necessary data from the process data in the database according to process names and process conditions. It is preferable to provide a function of displaying a graph representing a relationship between, for example, oxidization time and oxide film thickness according to the retrieved data, as shown in FIG. 8.

Figure 10:
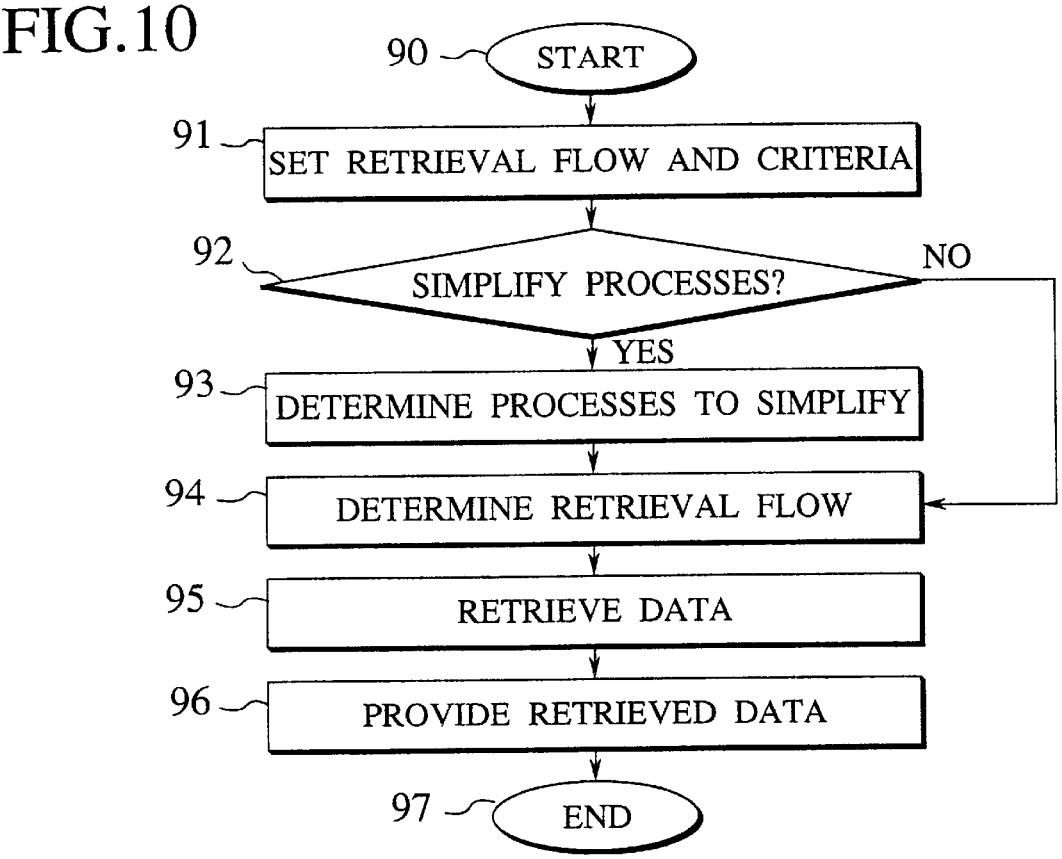
FIG. 10 is a flowchart showing the retrieval of process data according to still another embodiment of the present invention.

FIG. 10 is a flowchart showing the retrieval operation according to the embodiment of the present invention. Step 90 starts the retrieval operation. Step 91 enters a process flow and retrieval criteria. Step 92 determines whether or not the process flow must be simplified to omit some of the retrieval criteria. If it is determined to simplify, step 93 determines processes to simplify. Step 94 determines a process flow to retrieve. If no simplification is made, step 94 is directly carried out from step 92. Step 95 retrieves necessary data from the process data stored in the database according to the determined process flow. Step 96 provides the retrieved data. Step 97 ends the retrieval operation.

Although the embodiment classifies process names and process conditions in three groups, it is possible to increase the number of groups for more detailed classification. Instead, the process names may be classified in large and small groups. It is possible to change the number of groups from process to process. For example, a diffusion process may have large and small groups of process names and process conditions, and a deposition group may have large, intermediate, and small groups of them.

A third embodiment of the present invention will be explained with reference to FIGS. 6 to 8 and 11.

Figure 6:
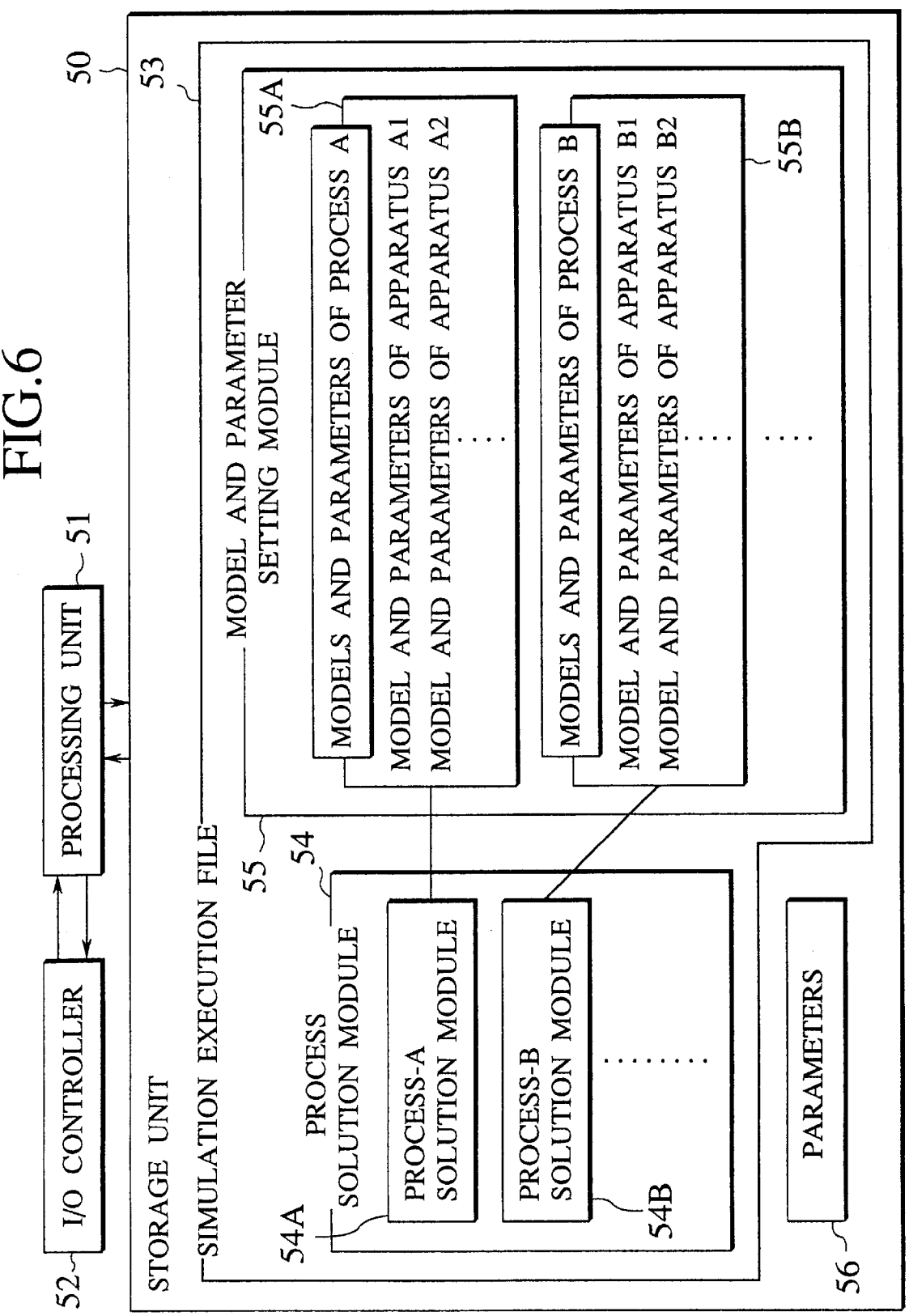
FIG. 6 shows a simulator according to the present invention.

FIG. 6 shows a simulator according to the embodiment. The simulator has a storage unit 50, a processing unit 51, and an I/O controller 52. The storage unit 50 has a simulation execution file 53 and a parameter file 56 for storing discretization data, etc. The processing unit 51 reads the file 53 and carries out numerical calculations accordingly. The I/O controller 52 provides simulation results to and receives data from an operator or a simulation system that centrally controls a plurality of simulators.

The storage unit 50 may be a memory unit or a disk unit of a computer. The processing unit 51 successively caries out the simulation execution file 53. When executing the file 53, the processing unit 51 issues input requests for the operator, activates a model/parameter setting module 55, executes a process solution module 54 including a process-A solution module 54A and a process-B solution module 54B, and refers to the parameter file 56 for discretization data, etc., other than the parameters set by the module 55.

The processing unit 51 has a CPU for sequentially executing the simulation execution file 53 and a main memory for temporarily storing the file 53 read out of the storage unit 50. The I/O controller 52 controls data input to an input section (not shown) for receiving data from the operator and simulation system, and data output to a display section (not shown), such as a display or a printer, and a central simulation control unit (not shown). The process solution module 54 carries out numerical calculations for discretization and simulation equations. The process-A solution module 54A carries out simulation for a process A, and the process-B solution module 54B carries out simulation for a process B. The processes A and B represent typical processes to be simulated.

Figure 7:
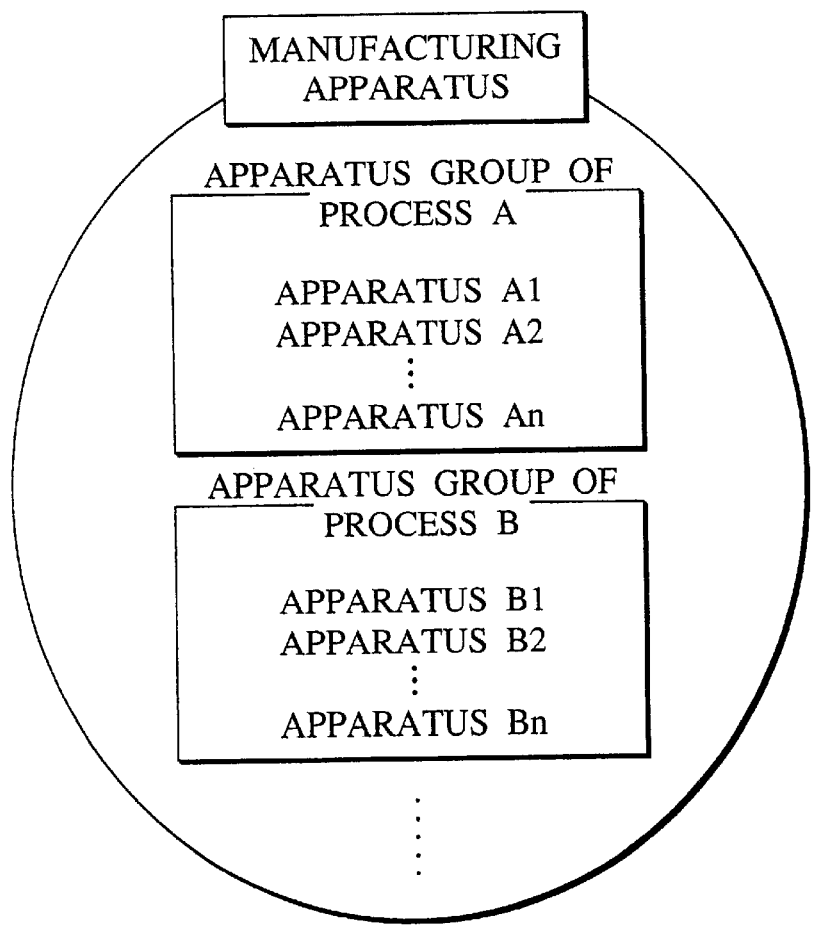
FIG. 7 shows a manufacturing system simulated according to the present invention.

FIG. 7 shows an example of an LSI manufacturing system. The system includes a process-A apparatus group and a process-B apparatus group. Apparatuses contained in the groups may include a diffusion apparatus, an ion implantation apparatus, and a deposition apparatus. A given process, for example, a diffusion process in an LSI manufacturing line usually involves a plurality of apparatuses A1, A2, and the like. The process-A solution module 54A and process-B solution module 54B of FIG. 6 correspond to, for example, a diffusion simulation file and an ion implantation simulation file, respectively. The same is applicable to the model/parameter setting module 55. Namely, a process-A model/parameter group 55A includes models and parameters for the apparatuses A1 and A2 (FIG. 6). In this way, the present invention is capable of separately setting models and parameters for individual apparatuses.

The present invention handles apparatuses individually because the apparatuses demonstrate different characteristics even on the same process. This is because there are no identical apparatuses even if they are of the same model. They have different characteristics due to, for example, calibration.

The operation of the simulator of FIG. 6 of the present invention will be explained. The operator enters a simulation instruction, which is transferred to the processing unit 51 through the I/O controller 52. The processing unit 51 interprets the instruction and copies the simulation execution file 53 to the main memory (not shown) thereof.

The processing unit 51 executes the file 53. Namely, the processing unit 51 executes the model/parameter setting module 55 on a given process. For example, the processing unit 51 carries out the apparatus-A1 model/parameter for the process A. The apparatus models and parameters for a given process may be included in entered data, or they may be provided by the production control system 2 if the simulator is connected thereto. In this case, the production control system 2 provides the simulator with information about the apparatuses and a prototype to simulate. Simulation results are displayed on the display through the I/O controller 52 so that the operator may study them.

Figure 11:
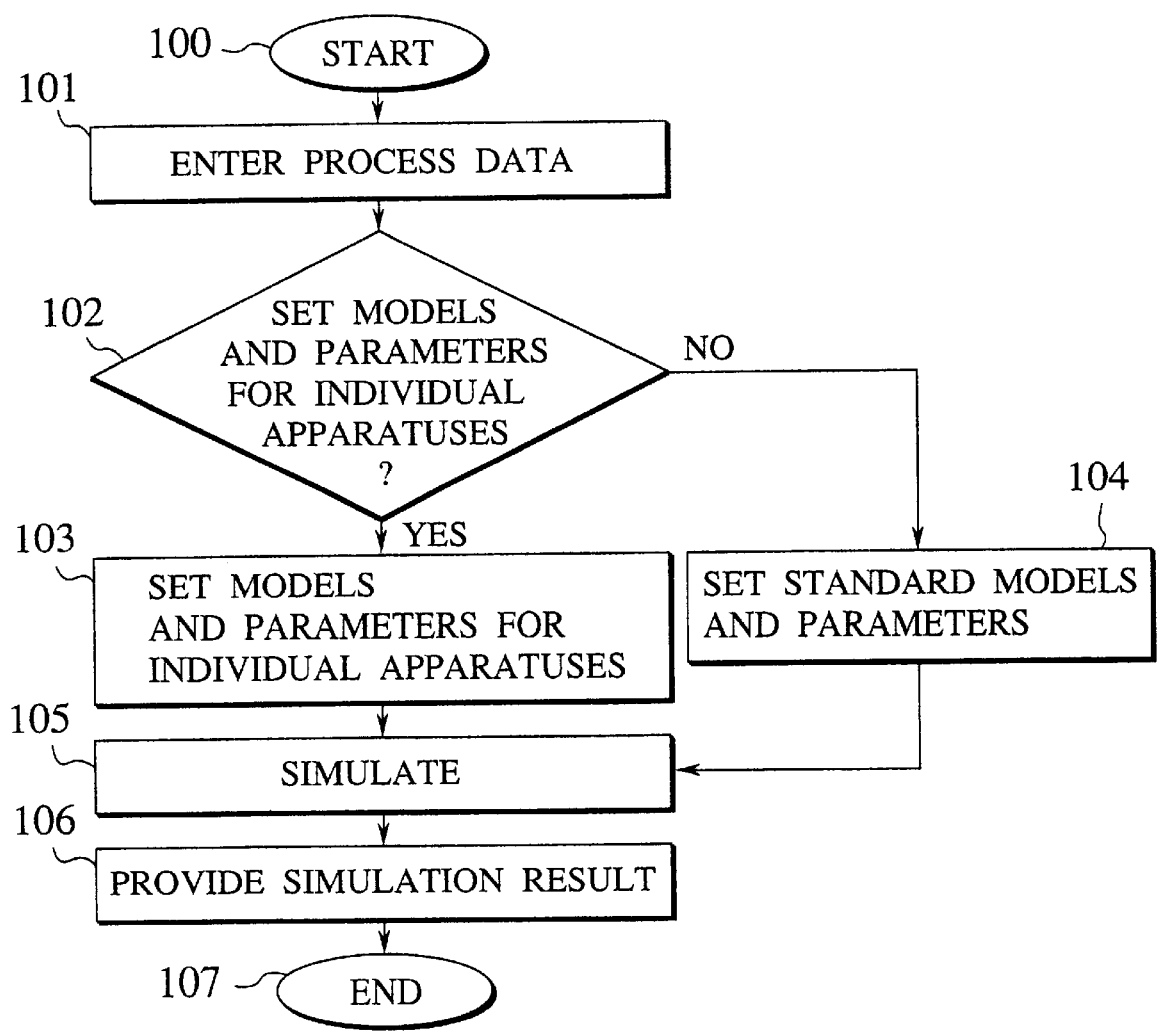
FIG. 11 is a flowchart showing a simulation operation according to the present invention.

FIG. 11 shows a flowchart showing a simulation operation carried out by the simulator of the present invention mentioned above. Step 100 starts the operation. Step 101 enters process data to specify models and parameters for each apparatus. The operator may enter these models and parameters through a terminal. Step 102 determines whether or not models and parameters for each apparatus must be set. If they must be set, step 103 sets them, and if not, step 104 sets standard models and parameters. Step 105 carries out simulation, and step 106 provides simulation results. Step 107 ends the operation.

The embodiment mentioned above sets models and parameters for each apparatus. It is possible to set only parameters for each apparatus and employ a common model for the apparatuses, if this provides correct simulation results. If the apparatuses show no conspicuous processing variations in a given process, standard models and parameters may be set for the process.

An oxidization process involving apparatuses A and B will be explained according to the above-mentioned embodiment. The apparatuses A and B are operated under various oxidization conditions, and related data is collected. The data is used to determine an oxidization model and parameters in advance. FIG. 8 shows a relationship between oxide film thickness and oxidization time in a dry oxidization process carried out at 1000° C. by the apparatuses A and B. A standard Deal-Grove model is employed. This model employs the following expression:

$$(tox^2 - \tau^2)/B = \tau - (B/A)(tox - \tau)$$

where tox is the thickness of an oxide film in micrometers, $\tau$ is oxidization time in minutes, $\tau$ is an initial oxide film thickness, B/A is a primary coefficient, and B is a secondary coefficient. These coefficients are obtained from FIG. 8. For the oxidization apparatus A, they are as follows:

$$B/A = 5.1 \times 10^{-6} \text{ [min/}\mu\text{m]}, B = 8.2 \times 10^{-6} \text{ [min/}\mu\text{m]}$$

For the apparatus B, they are as follows:

$$B/A = 5.5 \times 10^{-6} \text{ [min/}\mu\text{m]}, B = 8.5 \times 10^{-6} \text{ [min/}\mu\text{m]}$$

These parameters are separately used for the oxidization apparatuses A and B, to correctly simulate the oxidization process.

Figure 9:
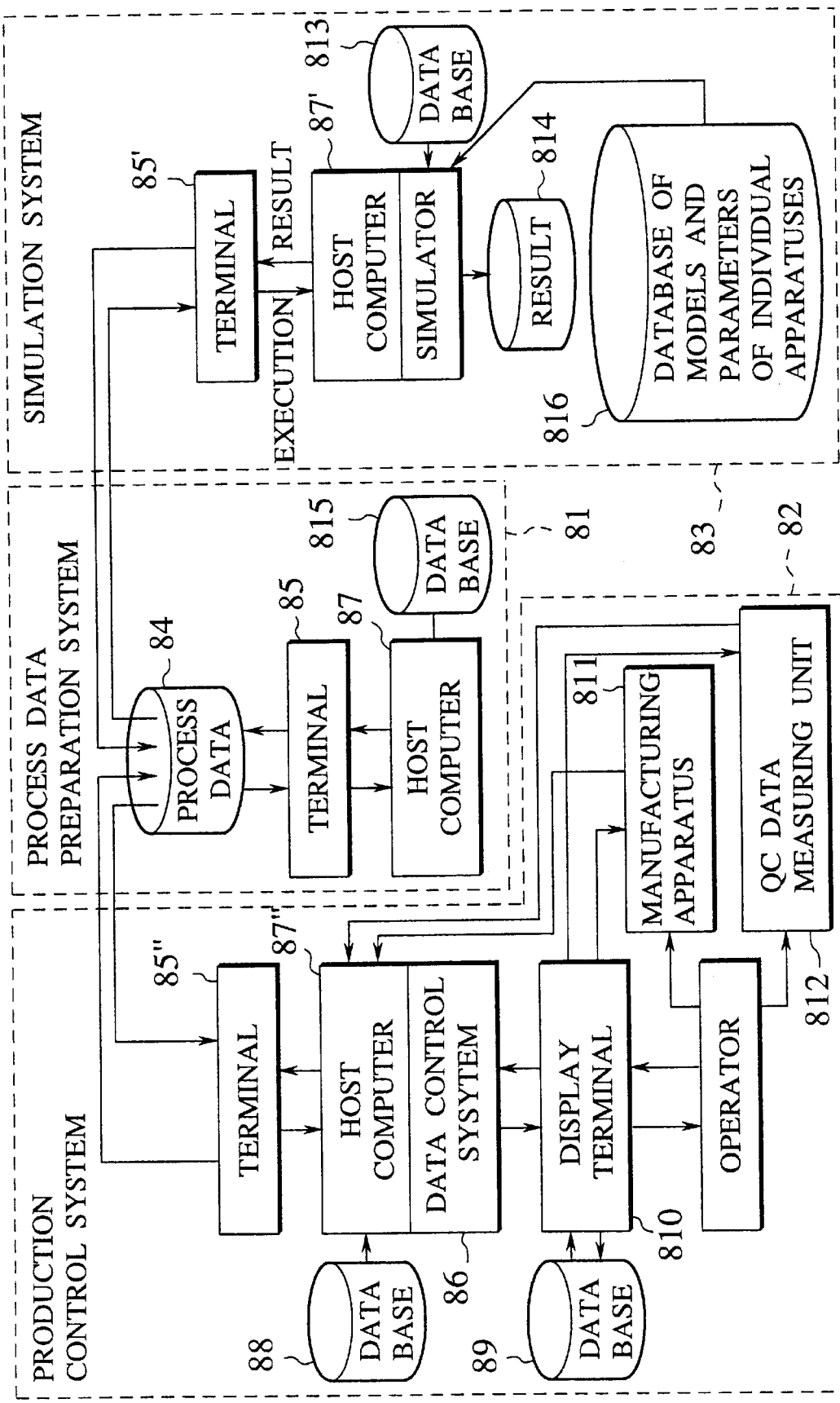
FIG. 9 shows a system for preparing manufacturing-process specifications according to another embodiment of the present invention.

A fourth embodiment of the present invention will be explained with reference to FIG. 9.

This figure shows a system for preparing process specifications for manufacturing LSIs, and a simulation system. In addition to the components of the simulation system of FIG. 2, the simulation system of FIG. 9 has a database 816 for storing models and parameters for each apparatus. To start simulation, a simulator 87' of the simulation system 83 reads models and parameters for each apparatus from the database 816. When simulating the manufacturing state of an LSI, apparatuses 811 send their conditions to process data 84 through a data control system 86, and corresponding data is read from the database 816 for simulation. Consequently, the conditions of the apparatuses are taken into the simulation. The operating hours and processing quantities of the apparatuses influence the abrasion of processing tools in, for example, a chemical mechanical polishing (CMP) process. Namely, the operating hours and process quantities of a given apparatus greatly affect a processing result by the apparatus. It is important, therefore, to collect data related to the operating hours and processed quantities of each apparatus. If a manufacturing schedule is changed in the middle of manufacturing to change the conditions of apparatuses, manufacturing processes after the change must be simulated and optimized. The present invention is capable of simulating manufacturing processes in consideration of every change made therein by the production control system, to thereby improve productivity and yield.

Figure 12:
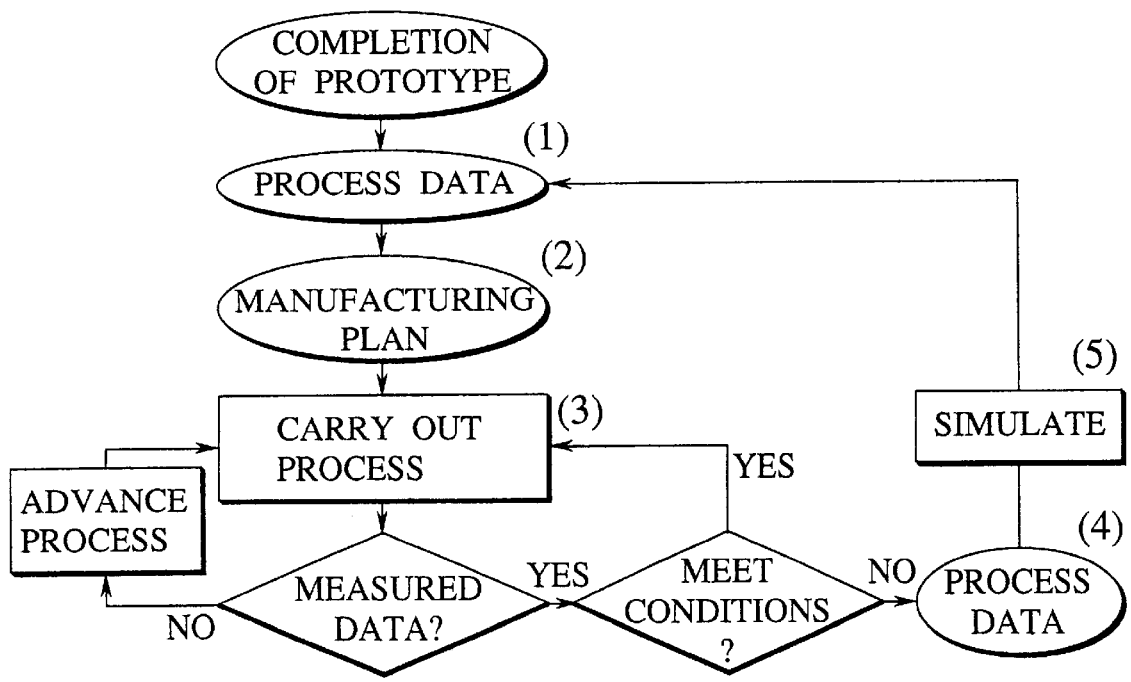
FIG. 12 is a flowchart showing a method of manufacturing semiconductor devices according to the present invention.

FIG. 12 is a flowchart showing a method of manufacturing semiconductor devices. This method employs the system for preparing manufacturing-process specifications of the present invention.

Figure 5:
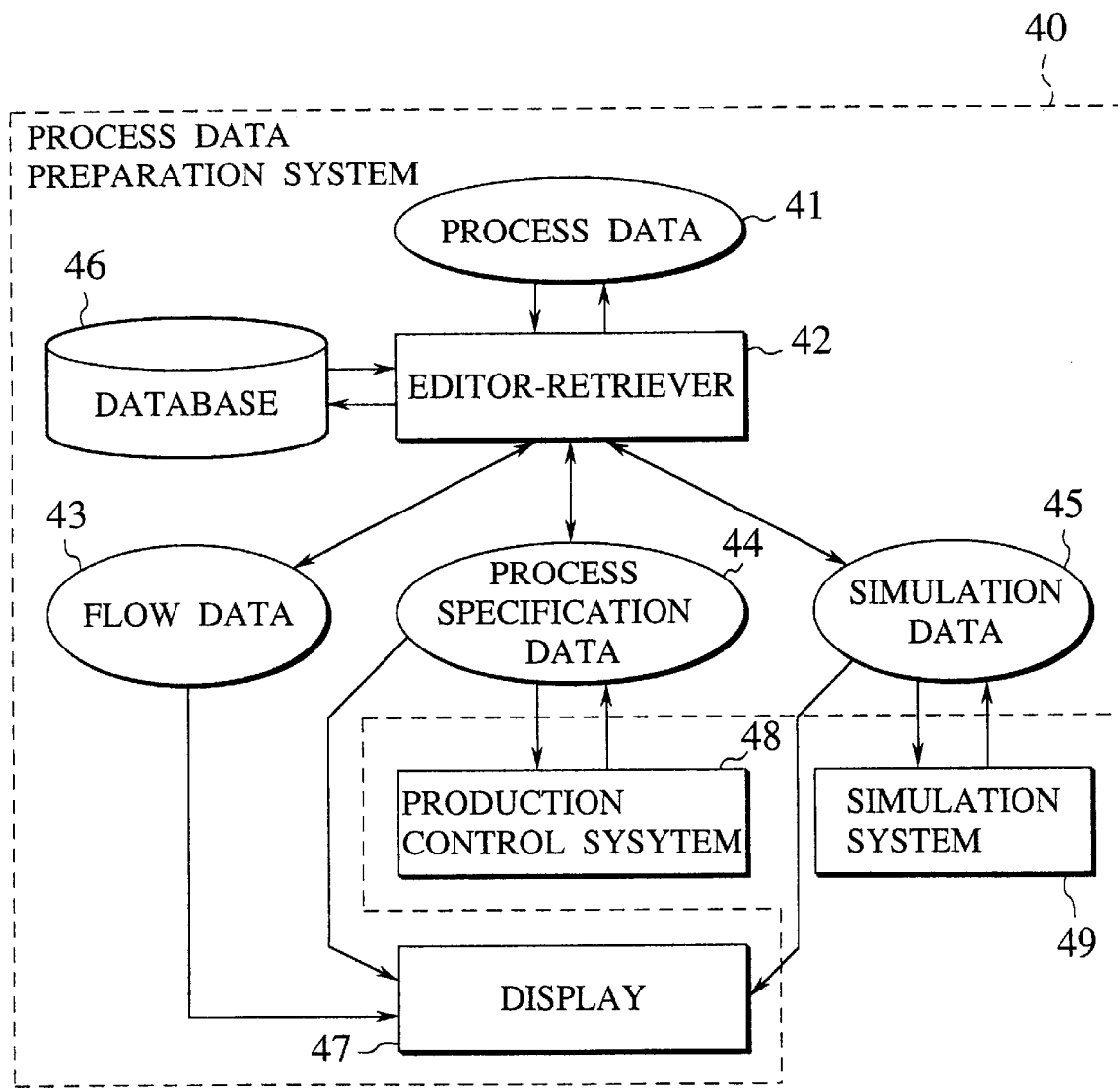
FIG. 5 shows a system for preparing the process data.

The process data preparation system (FIG. 5) of the present invention has a storage unit for storing process data and an editor for editing the process data. The process data is used for both the production control system and simulation system. The production control system sets the conditions of individual manufacturing processes, prepares specifications for the processes, and controls the processes. In step (1), the process data is prepared by the system (FIG. 5). In step (2), the process data is used to form a manufacturing plan for the production control system. In step (3), the production control system carries out processes according to the manufacturing plan and collects data through the processes. If the collected data does not match with the set conditions, new process data is prepared in step (4). The new process data is supplied to the simulation system in step (5). According to the new process data, a new manufacturing plan is formed, and the production control system carries out the processes according to the new manufacturing plan.

As explained above, the present invention provides a manufacturing-process-specification preparing system capable of equally handling production control and simulation, to effectively use simulation results and greatly improve productivity and yield. Process data prepared according to the present invention is an integration of process specification data and simulation data. Namely, the present invention forms a collective database of the process specification data and simulation data, to effectively accumulate production know-how and simulation know-how. This results in improving the efficiency of developing products and reducing manufacturing costs and time.

The foregoing description of preferred embodiments has been presented for purposes of illustration and description. It is not intended to be exhaustive or to limit the invention to the precise form described, and obviously many modifications and variations are possible in light of the above teaching. The embodiments were chosen in order to explain most clearly the principles of the invention and its practical application to enable others in the art to utilize most effectively the invention in various embodiments and with various modifications as are suited to the particular use contemplated.

What is claimed is:

1. A system for preparing manufacturing-process specifications, comprising:

a production control system configured to control actual manufacturing processes of apparatuses by use of process data and collecting quality control data measured through actual manufacturing processes;

a simulation system configured to execute a simulation by use of said process data and a simulation parameter and collecting a simulation result;

a database configured to store said process data including process name and process condition for a target device to be manufactured by each manufacturing process, each piece of said process data having unique identification and serving as input data to be directly inputted to and used to activate both of said production control system and said simulation system for a specific manufacturing process; and a shared data preparing system configured to update said process data by using both of the quality control data and the simulation result and providing the updated process data to a subsequent actual manufacturing process and a simulation process, wherein the entire process data is accumulated within a unified database so as to eliminate data conversion between said production control system and said simulation system.

2. The system of claim 1, wherein the database collects data for each of the apparatuses and is amended so as to reflect dependence among the apparatuses in carrying out the manufacturing processes.

3. The system of claim 1, wherein the database collects data for each apparatus of the same model and is amended so as to reflect dependence among the apparatuses of this same model in carrying out the manufacturing processes.

4. The system of claim 1, wherein the database consists of a process preparation database for storing the collected data and/or data to be corrected according to a result of simulation, a simulation database exclusive to the simulation system, and a production control database exclusive to the production control system.

5. The system of claim 1, wherein the process data includes common data serving as process specification data and simulation data, the common data including process names classified in at least two categories and process conditions classified in at least two categories.

6. The system of claim 1, further comprising:

editing means for editing process flow data that describes at least the sequence of manufacturing processes and the conditions of each of the manufacturing processes; and editing means for completing the process data by adding apparatus conditions and simulation conditions to the process data.

7. The system of claim 1, wherein the production control system has editing means for adding the names and conditions of apparatuses to the process data.

8. The system of claim 1, wherein the simulation system has editing means for adding a result of simulation to the process data.

9. The system of claim 1, further comprising:

retrieval means for retrieving necessary data from the process data with process conditions as retrieval criteria, the process data including common data serving as process specification data and simulation data, the common data including process names classified in at least two categories and process conditions classified in at least two categories.

10. The system of claim 1, further comprising:

storage means for storing models and parameters for apparatuses that are, simultaneously operated to carry out a manufacturing process so that the simulation system may use the models and parameters.

11. A method of preparing manufacturing-process specifications, comprising:

controlling actual manufacturing processes of apparatuses by use of process data;

collecting quality control data measured through actual manufacturing processes;

executing a simulation by use of said process data and a simulation parameter;

collecting a simulation result;

storing said process data including process name and process condition for a target device to be manufactured by each manufacturing process, each piece of said process data having unique identification and serving as input data to be directly inputted to and used to activate both a production control system a simulation system for a specific manufacturing process;

updating said process data by using both of the quality control data and the simulation result; and providing the updated process data to a subsequent actual manufacturing process and simulation process, wherein the entire process data is accumulated within a unified database so as to eliminate data conversion between said production control system and said simulation system.

12. The method of claim 11, wherein the common database contains common data serving as process specification data and simulation data, the common data including process names classified in at least two categories and process conditions classified in at least two categories.

13. The method of claim 11, wherein the common database contains at least process flow data, apparatus conditions, and simulation conditions, the process flow data describing the sequence of manufacturing processes and the individual conditions of the manufacturing processes.

14. The method of claim 11, wherein the common database contains the names and conditions of apparatuses.

15. The method of claim 11, wherein the common database contains simulation results.

16. The method of claim 11, wherein the common database contains process names classified in at least two categories and process conditions classified in at least two categories so that the process conditions may be used as retrieval criteria.

17. A system for preparing manufacturing-process specifications, comprising:

a production control system configured to control actual manufacturing processes of apparatuses by use of process data and collecting quality control data measured through actual manufacturing processes;

a first database configured to store process specification data derived from said process data for use in said production control system;

a simulation system configured to execute a simulation by use of said process data and a simulation parameter and collecting a simulation result;

a second database configured to store simulation data derived from said process data for use in said simulation system;

a third database configured to store said process data including process name and process condition for a target device to be manufactured by each manufacturing process, each piece of said process data having unique identification and serving as input data to be directly inputted to and used to activate both of said production control system, and said simulation system for a specific manufacturing process; and a shared data preparing system configured to update said process data by using both of the quality control data and the simulation result and providing the updated process data to subsequent actual manufacturing process and simulation process, wherein entire process data is accumulated within a unified database so as to eliminate data conversion between said production control system and said simulation system.

18. A system for preparing manufacturing-process specifications, comprising:

a production control system configured to control actual manufacturing processes of apparatuses by use of process data;

a simulation system configured to simulate the manufacturing processes by use of said process data and a simulation parameter;

a database configured to store said process data including process name and process condition for a target device to be manufactured by each manufacturing process, each piece of said process data having unique identification and serving as input data to be directly inputted to and used to activate both, of said production control system and said simulation system for a specific manufacturing process, wherein said database comprises, a first data section dedicated to the actual manufacturing process, a second data section dedicated to the simulation process, and a common data section containing said process data, and a process data search system configured to search desired process data, wherein a data item stored in the first or second data section is indexed and searched by at least one of said process name and said process condition stored in the common data section.

19. The system of claim 18, further comprising:

a display unit configured to display a listing of the process, name and process condition stored in the common data section and providing an input process name and process condition selected by an operator to said process data search system.

20. A system for preparing manufacturing-process specifications, comprising:

a production control system configured to control actual manufacturing processes of apparatuses by use of process data and collecting quality control data measured through actual manufacturing processes;

a simulation system configured to execute a simulation by use of said process data and a simulation parameter and collecting a simulation result;

a database configured to store said process data including process name and process condition for a target device to be manufactured by each manufacturing process, each piece of said process data having unique identification and serving as input data to be directly inputted to and used to activate both of said production control system and said simulation system for a specific manufacturing process;

a shared data preparing system configured to update said process data by using both of the quality control data and the simulation result and providing the updated process data to a subsequent actual manufacturing process and a simulation process; and a retrieval unit configured to retrieve a desired piece of process information for a certain manufacturing process to be inputted into at least one of said production control system and said simulation system by use of process flow data inputted through an input device, said process flow data being generated from said process name and process condition and prepared by specifying an execution sequence of a plurality of processes, wherein the entire process data is accumulated within a unified database so as to eliminate data conversion between said production control system and said simulation system.

21. The system of claim 20, wherein said database precedentially stores a standard simulation parameter for each process name and each process condition, said standard simulation parameter being appended to said process data.

22. The system of claim 20, wherein, in said database, said process name is hierarchically classified into a plurality of levels, each piece of process data being indexed and searched by said process name in each of said plurality of levels.

* * * * *